(12) United States Patent
Katou et al.

(10) Patent No.: US 8,227,693 B2
(45) Date of Patent: Jul. 24, 2012

(54) POWER SUPPLYING SYSTEM FOR A SLIDING STRUCTURE

(75) Inventors: Mitsunobu Katou, Kosai (JP); Tomoaki Nishimura, Kariya (JP); Motonari Inagaki, Kariya (JP)

(73) Assignees: Yazaki Corporation, Tokyo (JP); Aisin Seiki Kabushiki Kaisha, Aichi (JP)

( * ) Notice: Subject to any disclaimer, the term of this patent is extended or adjusted under 35 U.S.C. 154(b) by 239 days.

(21) Appl. No.: 12/724,085

(22) Filed: Mar. 15, 2010

(65) Prior Publication Data

US 2010/0243319 A1  Sep. 30, 2010

(30) Foreign Application Priority Data

Mar. 30, 2009  (JP) ................................. 2009-081197

(51) Int. Cl.
*H02G 3/04* (2006.01)

(52) U.S. Cl. ............ 174/72 A; 174/68.1; 174/68.3; 174/69; 174/97; 439/501; 211/26; 248/49

(58) Field of Classification Search ............ 174/72, 174/68.1, 68.3, 69, 97, 72 A; 439/501, 502; 361/826; 211/26; 248/49, 629
See application file for complete search history.

(56) References Cited

U.S. PATENT DOCUMENTS

| | | | | |
|---|---|---|---|---|
| 6,566,603 B2 * | 5/2003 | Doshita et al. | ............... | 174/72 A |
| 6,811,404 B2 * | 11/2004 | Doshita et al. | ................... | 439/34 |
| 7,683,259 B2 * | 3/2010 | Tsubaki et al. | .............. | 174/72 A |
| 2008/0128232 A1 | 6/2008 | Aoki et al. | | |
| 2009/0095858 A1 | 4/2009 | Katou et al. | | |
| 2009/0223132 A1 | 9/2009 | Aoki et al. | | |

FOREIGN PATENT DOCUMENTS

| | | |
|---|---|---|
| EP | 2 081 270 A1 | 7/2009 |
| JP | 2008-113510 A | 5/2008 |
| JP | 2008-148539 A | 6/2008 |
| JP | 2009-065814 A | 3/2009 |

* cited by examiner

*Primary Examiner* — Dhirubhai R Patel
(74) *Attorney, Agent, or Firm* — Sughrue Mion, PLLC

(57) ABSTRACT

A power-supplying system for a sliding structure includes: a protector cover having a base plate and a flange-shaped peripheral wall; a link arm rotatably supported along the base plate in the protector cover, and supporting a wiring harness at a top end side of a rotation; and an elastic member urging the link arm in a harness slack absorbing direction. The power-supplying system is disposed in the sliding structure. The protector cover is fixed to a panel of the sliding structure. An opening of the protector cover facing the base plate at a rear side is covered by the panel. The wiring harness is guided out from an oblong opening interposed between the protector cover and the panel toward a fixing structure.

3 Claims, 3 Drawing Sheets

US 8,227,693 B2

POWER SUPPLYING SYSTEM FOR A SLIDING STRUCTURE

CROSS REFERENCE TO RELATED APPLICATIONS

This application is on the basis of Japanese Patent Application No. 2009-081197, the contents of which are hereby incorporated by reference.

BACKGROUND OF THE INVENTION

1. Field of the Invention

The present invention relates to a power-supplying system for a sliding structure for continuously supplying electric power to such as a sliding door of a vehicle with a wiring harness.

2. Description of the Related Art

FIG. 2 shows an embodiment of a conventional power-supplying system for a sliding structure (See Patent Document 1).

In this power-supplying system 41, a link arm 43 is pivotally supported in a synthetic resin made protector 42 in a substantially trapezoidal shape at a sliding door side of a vehicle, and a metallic torsion coil spring 44 is attached to a shaft 50 of the link arm 43. The link arm 43 is urged upward by the coil spring 44. A harness holder 45 is provided at a tip end of the link arm 43. The wiring harness 46 is extended from a harness fixed portion 47 at a front end of the protector 42 to the harness holder 45, and further extended from the harness holder 45 via an oblong lower opening 48 of the protector 42 to a harness fixed portion 49. The protector 42 is composed of a base 42a and a cover 42b.

FIG. 2 shows a sliding door at a left side of a vehicle in a full open state by sliding forward. When the sliding door is half open, the wiring harness 46 is nearly slack between the sliding door and a vehicle body. However, the link arm 43 is rotated upward due to the urging force of the coil spring 44 to absorb a slack of the wiring harness 46. When the sliding door is fully open by sliding backward, the wiring harness 46 is pulled forward around the harness fixed portion 49, and the link arm 43 is rotated downward against the urging force of the coil spring 44.

[Patent Document 1] Japanese Published Patent Application No. 2008-148539 (FIG. 8(c))

FIG. 3 shows a conventional power-supplying system similar to the power-supplying system 41.

This power-supplying system 51 includes: a protector composed of a synthetic resin-made protector base 52 in a substantially trapezoidal shape, and a protector cover 53; a link arm 54 rotatably supported in the protector; a torsion coil spring 55 urging the link arm 54 upward; and a harness holding member 56 rotatably disposed at a tip end of the link arm 54. The harness holding member 56 is integrally formed with a sub arm 56a and a harness holding portion 56b.

The protector base 52 is assembled with the harness holding member 56 having the harness holding member 56 and the torsion coil spring 55. One end of a synthetic resin-made corrugate tube 57a of a wiring harness 57 is held in the harness holding portion 56b of the harness holding member 56. Electric wire portion 57b of the wiring harness 57 guided out from the corrugate tube 57a is curved in a substantially S-shape along the protector base 52 and guided to an outside of the protector base 52 from an opening 58 at a front end of the protector base 52. The protector base 52 is assembled and engaged with the protector cover 53.

The corrugate tube 57a is guided out from an oblong bottom opening 59 interposed between the protector base 52 and the protector cover 53. The other end of a synthetic resin-made corrugate tube 57a is rotatably supported by a harness fixing portion (rotating clamp) 60 mounted on a vehicle body side. Electric wire portion 57c guided out from the other end of the corrugate tube 57a is connected to another wiring harness (not shown) at the vehicle body side (battery side). The protector base 52 is fixed to a metallic door inner panel 62 of a vehicle sliding door with holes 61 in the protector cover 53 into which bolts are inserted. An operation of the power-supplying system 51 shown in FIG. 3 is similar to the power-supplying system 41 shown in FIG. 2.

However, in the power-supplying system 51 shown in FIG. 3, at least five parts of the protector base 52, the protector cover 53, the link arm 54, the torsion coil spring 55, and the harness holding member 56 should be assembled. Therefore, there is a problem that a component cost and an assembling cost are expensive.

This problem is applied to not only a sliding door of a vehicle, but also a siding door or the like of the other machine. These sliding doors or the like are referred to as a sliding structure, and a vehicle body or the like is referred to as a fixing structure.

Accordingly, an object of the present invention is to provide a power-supplying system for a sliding structure able to decrease the number of components and assembling man-hour for reducing cost.

SUMMARY OF THE INVENTION

In order to attain the object, according to the present invention, there is provided a power-supplying system for a sliding structure including:

a protector cover having a base plate and a flange-shaped peripheral wall;

a link arm rotatably supported along the base plate in the protector cover, and holding a wiring harness at a tip end side thereof; and an elastic member urging the link arm so as to absorb a harness slack, wherein the power-supplying system is disposed in the sliding structure, the protector cover is fixed to a panel of the sliding structure, an opening of the protector cover facing the base plate at a back side is covered by the panel, and the wiring harness is guided out from an oblong opening interposed between the protector cover and the panel toward a fixing structure.

These and other objects, features, and advantages of the present invention will become more apparent upon reading of the following detailed description along with the accompanied drawings.

DETAILED DESCRIPTION OF THE PREFERRED EMBODIMENTS

Figure 1:
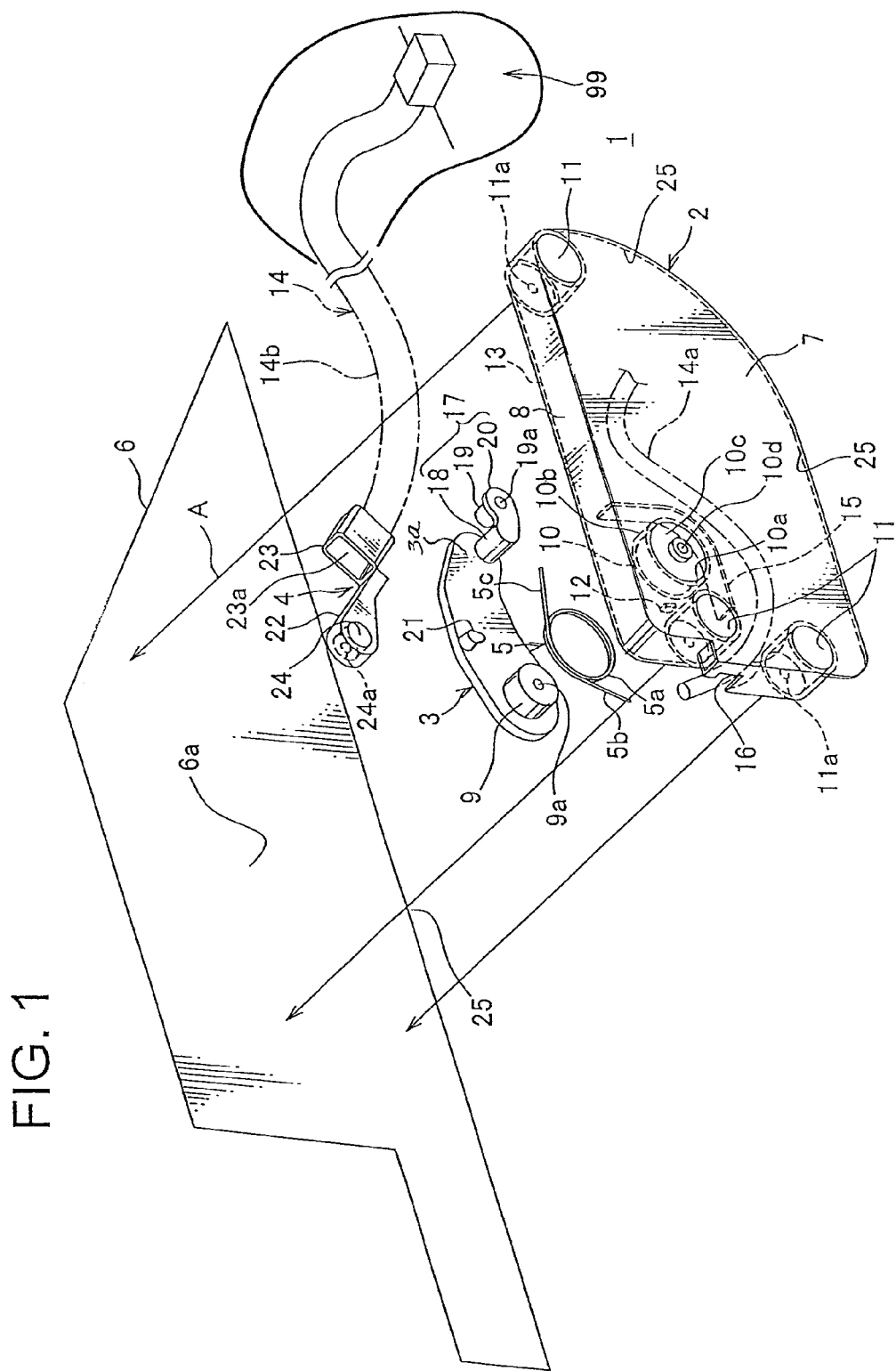
FIG. 1 is an exploded perspective view showing an embodiment of a power-supplying system for a sliding structure according to the present invention.

FIG. 1 shows a first embodiment of a power-supplying system for a sliding structure according to the present invention. In FIG. 1, the power-supplying system for a right side sliding door of a vehicle is shown (FIG. 3 shows a conventional power-supplying system for a left side sliding door).

This power-supplying system 1 includes: a synthetic resin-made protector cover 2; a synthetic resin-made or metallic link arm 3 rotatably supported by the protector cover 2; a synthetic resin-made harness holding member 4 rotatably provided at a tip end of the link arm 3; and a metallic torsion coil spring (elastic member) 5 urging the link arm 3 in a harness slack absorbing direction (upward).

Figure 3:
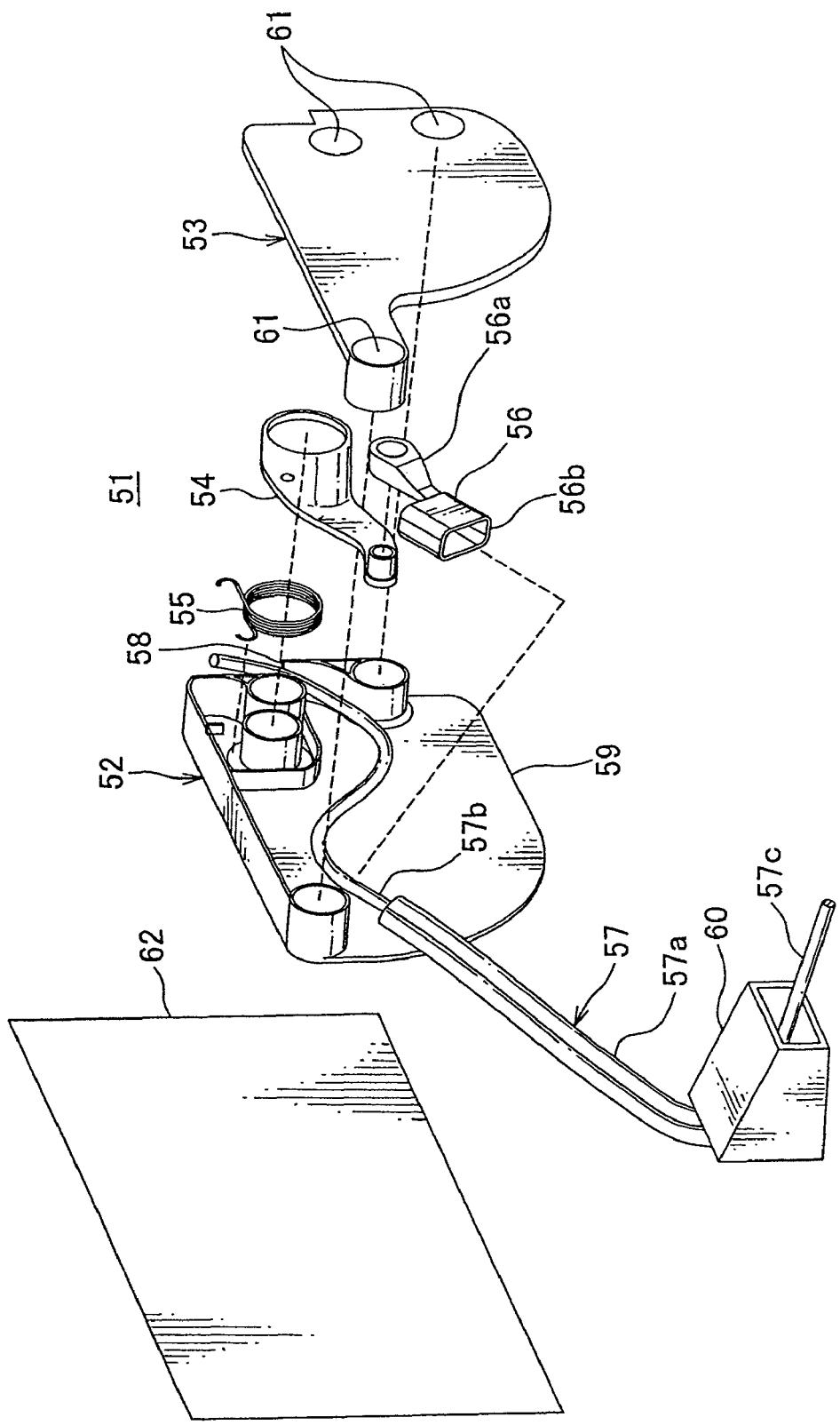
FIG. 3 is an exploded perspective view showing an embodiment of a conventional power-supplying system for a sliding structure similar to the embodiment shown in FIG. 2.

The protector is composed of only the protector cover 2, and the protector base shown in FIG. 3 is omitted. Further, a door inner panel (panel) 6 is made of synthetic resin, and the protector cover 2 is fixed to the synthetic resin-made door inner panel 6 with tapping screws (not shown).

The protector cover 2 includes: a vertical base plate 7; and flange-shaped peripheral walls at least disposed at a top end and a front end of the base plate 7. A circular wall 10 for positioning and engaging a shaft 9 at a base end of the link arm 3 and a coil winding portion 5a of the torsion coil spring 5 is projected toward the door inner panel 6 from a front upper side of an inner wall of the base plate 7. Tubular walls 11 for fixing the protector cover 2 with screws are disposed at a front end and a rear end of an inner wall of the base plate 7 (two tubular walls are disposed at the front end, and one tubular wall is disposed at the rear end), and projected toward the door inner panel 6. Reinforcing ribs (not shown) are provided horizontally and vertically on an outer wall of the base plate 7.

The shaft 9 of the link arm 3 is rotatably engaged along an inner periphery 10a of the circular wall 10. The coil winding portion 5a of the torsion coil spring 5 is a little freely fitted into an outer periphery 10b of the circular wall 10. The shaft 9 has a center hole 9a. A hole 10d is provided on a vertical wall 10c which is integral with the base plate 7 in the center of the circular wall 10. For example, a bolt (not shown) is inserted into both holes 9a, 10d, and engaged with a nut, or an engaging clip (not shown) is inserted into the holes 9a, 10d to rotatably hold the shaft 9 in the circular wall 10.

An upper limit of the rotation of the link arm 3 is limited by an upper peripheral wall 8. A spring receiver 12 for hooking a rod portion 5b of the torsion coil spring 5 continued from the winding portion 5a is projected from an inner wall of the base plate 7 at a front side of the circular wall 10.

Small holes 11a for inserting the tapping screws are respectively provided on bottom walls of the tubular walls 11. When the tapping screw is directly screwed into the synthetic resin-made door inner panel 6 via the small hole 11a like an arrow A in FIG. 1 (preferably, a pilot hole is not provided on the door inner panel 6), the tapping screw is in close contact with the door inner panel 6 without any gap.

Conventionally, as shown in FIG. 3, when the synthetic resin-made protectors 52, 53 are assembled to the metallic door inner panel 62, the protector 52, 53 may be deformed by temperature change due to a linear expansion coefficient difference. Therefore, for absorbing thermal expansion or contraction of the synthetic resin, an expensive shoulder bolt (not shown) and a seal nut (not shown) are used, so that the assembling cost is increased. However, according to the present invention, by using the synthetic resin-made door inner panel 6 and the tapping screw, this problem is solved, and the shoulder bolt and the seal nut are not necessary.

Further, because the door inner panel 6 is made of synthetic resin, the linear expansion coefficient thereof is substantially equal to that of the synthetic resin-made protector cover 2, the deformation of the protector cover 2 owing to the linear expansion coefficient difference after screw fitting is prevented.

The door inner panel 6 covers an opening 13 at a back side opposite to the base plate 7 of the protector cover 2. An electric wire portion 14a of a wiring harness 14 routed in a substantially S-shape in the protector cover 2 is vertically guided along a door inner panel wall 6a.

A curved partition wall 15 for guiding the wiring harness 14 is projected between the circular wall 10 and the front side tubular wall 11 from the inner wall of the protector cover 2. A front end of the partition wall 15 is continued to an opening 16 for guiding out the wiring harness. The electric wire portion 14a of the wiring harness 14 is guided out from the opening 16 toward auxiliaries or the like in the sliding door.

The electric wire portion 14a in the protector cover 2 is inserted into a synthetic resin-made corrugate tube 14b held by the harness holding member 4 (for the sake of convenience, the electric wire portion 14a is separated from the corrugate tube 14b in FIG. 1).

The link arm 3 is formed in a substantially L-shape, and includes: the large diameter shaft 9 at a base end thereof; a connecting portion 17 for the harness holding member 4 at a tip end side 3a thereof; and a hook-shaped spring receiver 21 for hooking and holding the other rod portion 5c of the torsion coil spring 5 at the upper center thereof in a longitudinal direction. The connecting portion 17 in this embodiment is composed of: a horizontal support rod 18 projected from an outer wall of the link arm 3 in the same projecting direction as the shaft 9; a vertical plate 20 extending from the support rod 18 in a longitudinal direction of the link arm 3; and a small diameter shaft 19 projected from an inner wall of the plate 20.

The harness holding member 4 is integrally composed of a sub arm 22 and a harness holding portion 23. The shaft 19 of the connecting portion 17 of the link arm 3 is inserted into a hole portion 24 at a base end of the sub arm 22. For example, an engaging clip or the like is inserted into a small hole 19a in the center of the shaft 19 and a small hole 24a on a bottom plate of the hole portion 24 so that the sub arm 22 is rotatably supported and held by the shaft 19.

The harness holding portion 23 is formed integrally with a tip end of the sub arm 22. For example, while the harness holding portion 23 is separated left and right, an end of the corrugate tube 14b is inserted into the harness holding portion 23 (then, a not-shown groove of the corrugate tube 14b is engaged with a not-shown rib on an inner wall of the harness holding portion 23), then, the separated harness holding portion 23 is engaged with each other to hold the corrugate tube 14b.

The corrugate tube 14b has an oblong circular section, and a tube holding hole 23a of the harness holding portion 23 also has an oblong circular section. One end of the corrugate tube 14b is guided out swingably in a front-back direction from a lower oblong opening 25 provided between the protector cover 2 and the door inner panel 6. The other end of the corrugate tube 14b is fixed to a not-shown harness fixing portion (rotary clamp) at a vehicle body side 99, and the electric wire portion 14a in the corrugate tube 14b is connected to a not-shown wiring harness at the vehicle body side 99.

The link arm 3, the harness holding member 4, and the torsion coil spring 5 are assembled and received in a space surrounded by the base plate 7 of the protector cover 2, and the peripheral wall 8. The door inner panel 6 covers the wide opening 13 provided at the inner wall side of the protector cover 2 so as to protect the link arm 3, the harness holding member 4, and the torsion coil spring 5 in the protector cover 2 from external interference.

At least the link arm 3, the harness holding member 4, and the torsion coil spring 5 are assembled to the protector cover 2, and sent as a unit to a vehicle assembling process (preferably, the wiring harness 14 is previously assembled to the protector cover 2 together with the link arm 3 and the like).

Figure 2:
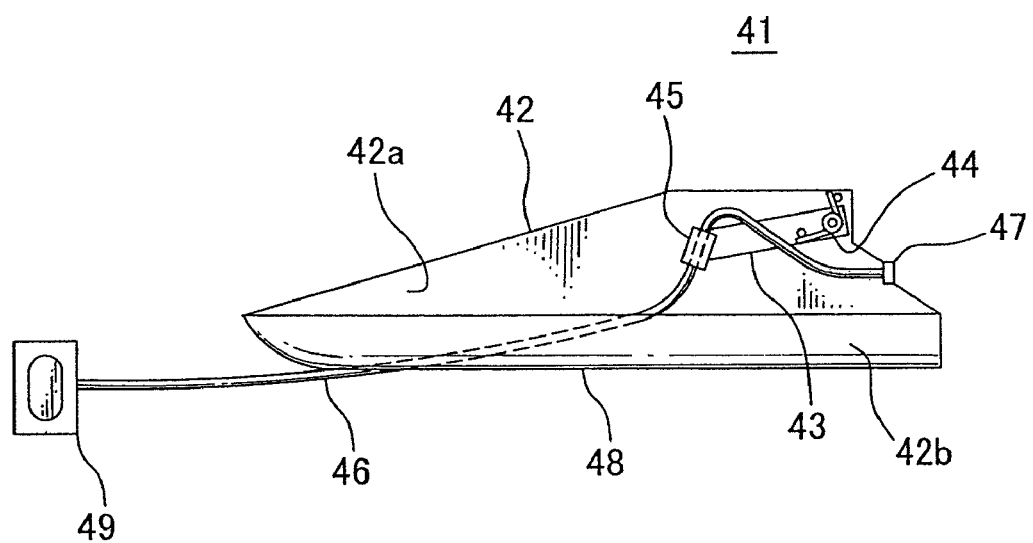
FIG. 2 is a front view showing an embodiment of a conventional power-supplying system for a sliding structure.

An operation of the power-supplying system 1 in this embodiment is substantially the same as the conventional power-supplying systems 41, 51 as shown in FIGS. 2 and 3. Namely, when the sliding door turns to be open or closed, the link arm 3 is rotated in an up-down direction along the substantially vertical door inner panel 6 and the base plate 7 of the protector cover 2, and absorbs the slack of the wiring harness 14 due to an upward urging force of the torsion coil spring 5.

When the sliding door turns to be in a fully closed state, the wiring harness 14 is pulled backward around a harness fixing portion (not shown) at the vehicle body side 99, and the link arm 3 is rotated a little downward, from horizon (clockwise direction in FIG. 1). When the sliding door turns to be in a full open state, the wiring harness 14 is pulled forward around the harness fixing portion, and the link arm 3 is rotated downward largely against the urging force of the torsion coil spring 5.

Incidentally, in this embodiment, the door inner panel 6 is made of synthetic resin. However, for example, when the linear expansion coefficient difference between the door inner panel 6 and the protector cover 2 does not negatively affect (for example, an area in which temperature difference is little), or when the protector cover 2 is made of metal, the door inner panel 6 may be made of metal, and the protector cover 2 may be fixed to the door inner panel 6 with economical bolts and nuts. Even in this case, because the protector base is canceled, the component cost and the assembling cost are reduced relative to the conventional power-supplying system.

Further, in this embodiment, the harness holding member 4 is rotatably coupled to the link arm 3. However, the harness holding portion 23 may be integrally formed (un-rotatably) on the tip end of the link arm 3. In this case, the link arm 3 is extended to the sub arm 22.

Further, in this embodiment, the substantially rectangular tube-shaped harness holding portion 23 is used for holding the corrugate tube 14*b*. However, instead of the substantially rectangular tube-shaped harness holding portion 23, a holding plate (not shown) to which the wiring harness 14 is fixed with a tape or a band may be used.

Further, in this embodiment, the torsion coil spring 5 is used as the elastic member. However, instead of the torsion coil spring 5, for example, a metallic flat spring (not shown) may be used. In this case, a base end of the flat spring is fixed to the front wall of the protector cover 2, and a tip end of the flat spring is engaged with the center of the link arm 3 in the longitudinal direction to urge the link arm 3 upward (harness slack absorbing direction). Incidentally, a fixed structure of the flat spring is more complex, and larger than that of the torsion coil spring 5.

The power-supplying system for a sliding structure according to this invention is used in a sliding door or a sliding part of a vehicle or the like.

Preferably, the protector cover and the panel are made of synthetic resin, and the protector cover is fixed to the panel with a tapping screw.

Preferably, the elastic member is a torsion coil spring. Further, a harness holding member is rotatably provided at the tip end side of the rotation of the link arm.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A power-supplying system for a sliding structure comprising:
    a protector cover having a base plate and a flange-shaped peripheral wall;
    a link arm rotatably supported at a base end thereof by the base plate of the protector cover, and holding a wiring harness at a tip end thereof; and
    a spring member urging the link arm in a rotational direction so as to absorb a harness slack,
    wherein the power-supplying system is disposed in the sliding structure, the protector cover is fixed to a panel of the sliding structure, an opening of the protector cover facing the base plate at a back side is covered by the panel, and the wiring harness is guided out from an oblong opening interposed between the protector cover and the panel toward a fixing structure.

2. The system as claimed in claim 1,
    wherein the protector cover and the panel are made of synthetic resin, and the protector cover is fixed to the panel with a tapping screw.

3. The system as claimed in claim 1,
    wherein the spring member is a torsion coil spring, and
    wherein a harness holding member is rotatably provided at the tip end of the rotation of the link arm.

\* \* \* \* \*